US010116029B2

(12) United States Patent
Wang (10) Patent No.: US 10,116,029 B2
(45) Date of Patent: Oct. 30, 2018

(54) ULTRA-WIDE BAND CIRCULATORS WITH SEQUENTIALLY-SWITCHED DELAY LINE (SSDL)

(71) Applicant: THE REGENTS OF THE UNIVERSITY OF CALIFORNIA, Oakland, CA (US)

(72) Inventor: Yuanxun Ethan Wang, Manhattan Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/590,911

(22) Filed: May 9, 2017

(65) Prior Publication Data

US 2017/0331168 A1    Nov. 16, 2017

Related U.S. Application Data

(60) Provisional application No. 62/439,119, filed on Dec. 26, 2016, provisional application No. 62/334,562, filed on May 11, 2016.

(51) Int. Cl.
*H01P 1/18* (2006.01)
*H01P 1/38* (2006.01)
*H01P 9/00* (2006.01)
*H04B 1/7163* (2011.01)

(52) U.S. Cl.
CPC .............. *H01P 1/38* (2013.01); *H01P 1/184* (2013.01); *H01P 9/003* (2013.01); *H04B 1/7163* (2013.01)

(58) Field of Classification Search
CPC ............... H01P 1/38; H01P 1/18; H01P 1/184

USPC ................ 333/1.1, 24.2, 156, 161, 164
See application file for complete search history.

(56) References Cited

U.S. PATENT DOCUMENTS

| 5,347,239 A | 9/1994 | Loehner et al. |
| 7,724,107 B2 | 5/2010 | Miya |
| 2004/0001020 A1 | 1/2004 | Huettner |
| 2007/0274238 A1 | 11/2007 | Kim |

FOREIGN PATENT DOCUMENTS

WO    2004015809 A2    2/2004

OTHER PUBLICATIONS

ISA/US, United States Patent and Trademark Office, International Search Report and Written Opinion dated Jan. 2, 2018, related PCT international application No. PCT/US2017/055468, pp. 1-11, with claims searched, pp. 12-17.
Biedka, Matthew Michael, "Ultra Wide-Band Circulator through Sequentially-Switched Delay Line (SSDL)", University of California, Los Angeles, Thesis filed with eScholarship.org, published Jun. 27, 2016, 51 pages.

(Continued)

*Primary Examiner* — Stephen E Jones
(74) *Attorney, Agent, or Firm* — O'Banion & Ritchey LLP; John P. O'Banion (57) ABSTRACT

A passive circulator utilizing sequentially-switched delay lines (SSDL) in which delay line sections are sequentially turned on and off to achieve non-reciprocity to provide rejection/separations between different signals at the same/similar frequency, such as between a transmitted and received signal. The circulator is well-suited for on-chip integration and can be utilized across a wide frequency range. Various embodiments are described for separating signal waveforms.

26 Claims, 5 Drawing Sheets

(56) References Cited

OTHER PUBLICATIONS

ISA/US, International Search Report and Written Opinion dated Aug. 2, 2017, counterpart PCT international application No. PCT/US2017/031800, pp. 1-10, with claims searched, pp. 11-16.
Wang, Yuanxun Ethan, et al., "Abstract in response to DARPA-BAA-16-20: Chip-Scale RF Signal Processing for Future Radios", submitted Mar. 11, 2016, pp. 1-9.

ULTRA-WIDE BAND CIRCULATORS WITH SEQUENTIALLY-SWITCHED DELAY LINE (SSDL)

CROSS-REFERENCE TO RELATED APPLICATIONS

This application claims priority to, and the benefit of, U.S. provisional patent application Ser. No. 62/439,119 filed on Dec. 26, 2016, incorporated herein by reference in its entirety. This application also claims priority to, and the benefit of, U.S. provisional patent application Ser. No. 62/334,562 filed on May 11, 2016, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to circulators for separating transmitted and received signals, and more particularly to a Sequentially-Switched Delay Line (SSDL) circulator.

2. Background Discussion

Traditional circulators have been utilized extensively in various communication systems as a means of separating transmitted and received signals. It is widely understood that a three-port passive component that is lossless and matched requires the use of non-reciprocal, ferrite-based magnetic materials.

Ferrite circulators are cavities that have the ability to support non-reciprocal resonant modes. This classical form of circulator lacks wideband performance, and due to its size and nature cannot be incorporated into modern integrated circuits (ICs). Active circulators have been realized based on the non-reciprocal transfer behavior of transistors. In comparison with traditional circulators, these active circulators offer small physical size and are compatible with integrated circuit (IC) technology.

However, active circulators are subject to high noise and limited power performance, which prevents their use in systems requiring a wide dynamic range.

The realization of non-reciprocity without exploiting magnetic material properties has been introduced in a number of approaches in which the dielectric property of a conventional transmission line was modulated in time and space to break the material property symmetry. This realization has been employed in the field of photonics where RF modulation is used to achieve non-reciprocity in optical frequencies, or in acoustics where the time-modulation was added by a fan to create single directional acoustic wave propagation. A parametric modulation architecture was applied to a resonant ring to form non-reciprocity at radio frequencies (RF) through emulating the operation of a magnetic circulator. Yet the measured results show a high insertion loss and an extremely narrow isolation bandwidth.

Broadband isolation at RF has been demonstrated on a printed circuit board or on a Microwave/Millimeter-wave Monolithic Integrated Circuit (MMIC) based on the concept of Time-Varying Transmission Line (TVTL) technology. That approach can offer a broadband isolation while its lowest operating frequency is designated by the longest delay of the TVTL one can implement on chip, which may result in a large chip area for low RF frequencies. The depth of isolation of the TVTL isolator over a broad bandwidth is also limited by a SINC function, unless a more complex non-uniform modulation or balanced architecture is used. It will be noted that the SINC function can also be referred to as the "sampling function", and is a function utilized frequently in signal processing and Fourier transform theory, with its full name being "sine cardinal" function, yet often referred to as simply "SINC".

Accordingly, a need exists for realizing high performance integrated circuit circulators for use in transmitters and radars requiring reciprocity. The present disclosure fulfills that need and provides additional benefits over previous technologies.

BRIEF SUMMARY

A circulator with sequentially-switched delay lines (SSDL) is described. By way of example, and not of limitation, the SSDLs are implemented by sequentially turning on and off switches that are connected to multiple segments of delay lines. A rough analogy to this sequencing is found in one's daily experience of one-way traffic signals synchronized with the turning on of multiple green lights to pass all the way without stopping, while the traffic in the other direction experiences delays. The disclosed technology offers a true passive solution that can enable circulators on-chip across a very large frequency range, from almost DC to light.

The disclosed technology provides a practical, robust and cost efficient way of implementing high performance circulators which are particularly well-suited for integration on chip and utilized in basically any wireless transmitters and radar sensor systems that require reciprocity. Additionally, the technology offers a near ideal solution to the problem of separating simultaneous transmit and receive signals at the same frequency in wireless communication systems or radar/sensor systems, to protect the receiver from transmitter interference.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

This disclosure describes a time switching strategy for circulators that involve sequentially turning on and off switches that are connected to multiple delay lines segments in the circulator. This approach is referred to herein as a Sequentially-Switched Delay Line (SSDL). Remarkably, by using SSDL technology a true passive circulator may be achieved with high isolation, such as greater than 20 dB and preferably greater than 30 dB, from almost DC to light frequency, and with a footprint can fit in an integrated circuit (chip) of a few millimeters in area.

Figure 1:
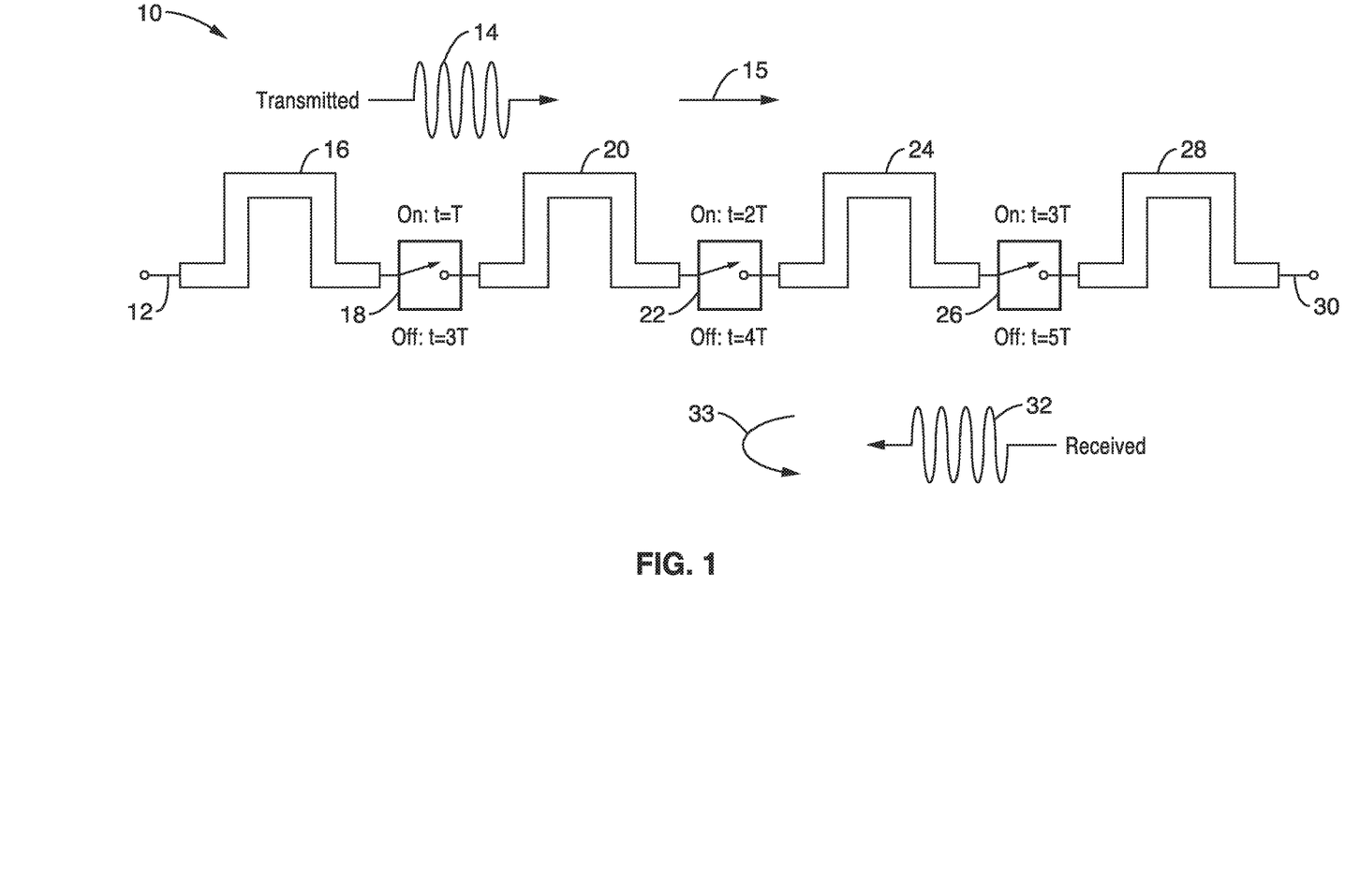
FIG. 1 is a block diagram showing breaking space-time symmetry of wave propagation through Sequentially Switched Delay Line (SSDL) according to an embodiment of the disclosed technology.

FIG. 1 illustrates an embodiment 10 of the technology where non-reciprocity is achieved through sequentially switching each of multiple equal length (equal delay) transmission line (TL) segments, or other delay segments, 16, 20, 24, 28, with the delay time of T in switching blocks 18, 22, 26. Although typically, the delay lines are of the same composition wherein equal length of the line equates to equal delay, it should be noted that the design does not require that they be of the same composition, wherein equal delays could be achieved with different length TLs. It should be appreciated that the delay lines in the present disclosure need not be transmission lines, but may implemented in other forms of delay lines, such as surface acoustic wave (SAW) delay lines, optical fiber, LC filter networks and so forth. It should be appreciated that although only three switches are shown interposed, respectively, between each of the four TL segments, that embodiments of the present disclosure may be configured for any desired number of TL+switch stages, such as having at least 3 switches.

Assuming the wave is launched from left to the right as transmitted 14 from input 12 to a first line segment 16, and it lasts for a time duration of 2T, and the switches are turned on right before the wave arrives and off right after the wave departs, the transmitted wave will not see any stop until it arrives to the right end, thus it passes through 15. Thus, the transmitted wave from 12 passes through first TL segment 16, through switch 18, through TL segment 20, through switch 22, through TL segment 24, through switch 26, through TL segment 28 to output 30. Each switch being closed prior to the waveform reaching it, as it is seen in the sequence of switches that the ON time varies with switch 18 ON at t=T, switch 22 coming on at t=2T, and switch 26 activating at t=3T. The delay of each TL segment (e.g., 16, 20, 24, 28) being a time unit equal to T.

Contrary to this, the wave launched from right to the left from input 30 as received 32 will inevitably encounter an open switch along its propagation path causing reflections and delays 33. Thus, since this opposite direction signal will be encountering switches being activated in response to a signal traveling in the opposite direction, it must reach a closed switch along the path.

It is similar to one's daily experience that the one-way traffic synchronized with the turning on of multiple green lights can pass all the way without stop but the traffic in the other direction will experience delay.

Combining this symmetry breaking technique with multiplexing/demultiplexing techniques, a circulator can be built allowing seamless transmission of both transmitted and received waves without stop or reflections, yet providing theoretically infinite isolation between the two.

Figure 2A:
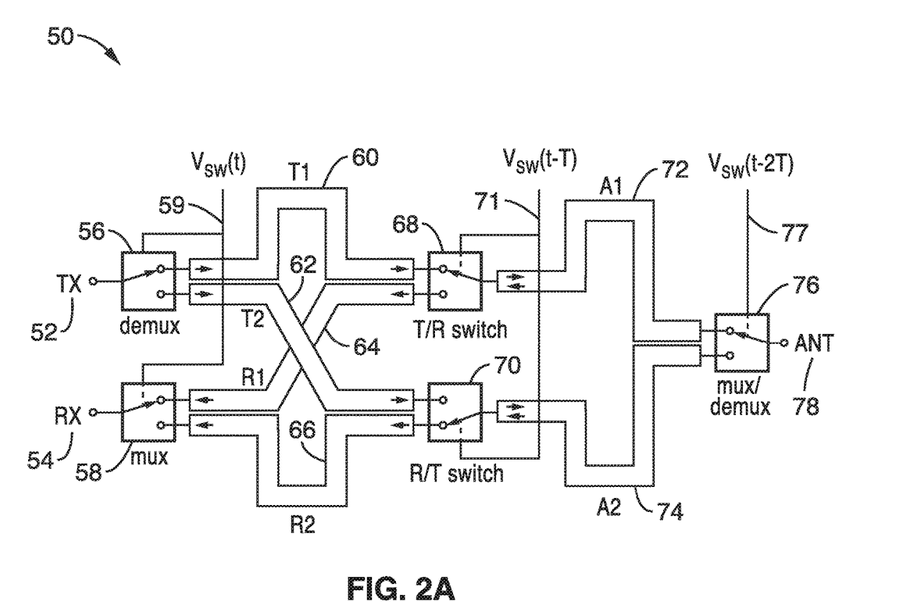
FIG. 2A and FIG. 2B are a block diagram and waveform, respectively, for an embodiment of a circulator with SSDL according to an embodiment of the disclosed technology.

FIG. 2A illustrates an example SSDL circulator embodiment 50 having transmitter (TX) input 52 and receiver (RX) output 54, coupled through N (e.g., six) segments of delay line tracks (60, 62, 64, 66, 72, 74) with N−1 (e.g., five) interposed SPDT switches (56, 58, 68, 70, 76), to antenna (ANT) connection 78. Control signals 59, 71 and 77 are shown in the figure for controlling the SPDT switches with signals $V_{SW}(t)$, $V_{SW}(t-T)$, and $V_{SW}(t-2T)$, respectively.

Figure 2B:
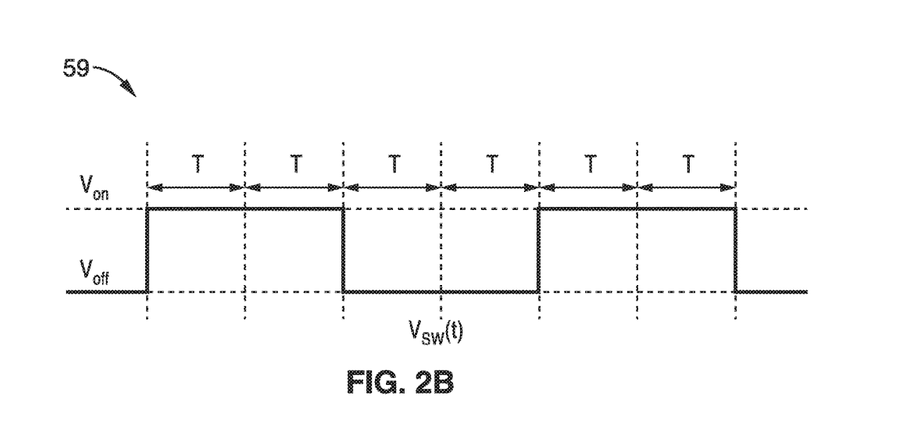

FIG. 2B illustrates a waveform 59 for the $V_{SW}(t)$ signal seen in FIG. 2A, depicting it's on periods and off periods of 2T each, by way of example and not limitation.

Important operating principles are described as follows:

1. The transmitted wave at input 52 is split into two pulses each with a duration of 2T (seen in FIG. 2B) through the TX demux switch 56. These signals follow a path of either TX (52)→T1 (60)→A1 (72)→ANT (78), or TX (52)→T2 (62) →A2 (74)→ANT (78) where the switches are turned on sequentially just prior to arrival of the wave and turned off right after the wave departs, and finally the two pulses are combined at the ANT port 78 through the ANT mux switch 76.

2. For the received wave, the ANT demux switch 76 splits the wave into two 2T pulses in a similar fashion but at a time delay of 2T compared to that of the TX mux. The received wave follows a path of either ANT (78)→A2 (74)→R2 (66)→RX (54) or ANT (78)→A1 (72)→R1 (64)→RX (54), where the previous switching pattern also turned on and off those tracks sequentially along the way.

3. The T/R switch or the R/T switch is always turned to the other path the moment when the wave in the previous path completes its passage so there is neither reflection nor alteration to the waveform.

It is worth noting that there is no absolute requirement of either switching time or delay length except the synchronization of the two. In theory, the circulator concept is valid from DC to light wave assuming switches and delay lines are available at those frequencies. In practical applications, switching noise may be a concern. Therefore, it is preferable to set the switch frequency much higher than the signal frequency for noise sensitive applications such as STAR so that the spectrum of the switching noise will be shaped toward the higher end of the and not impact the signal band.

A short delay line is also desired for on-chip integration but it requires switch devices operating at GHz switching speed with low loss.

EXAMPLE DEVICE EMBODIMENT

In one specific embodiment, each of the delay lines is configured to have a delay of 83 ps which corresponds to a straight line length of 8 mm on a GaN substrate and the actual area of the line after meandering may be close to 1 mm×1 mm. With six such delay lines and five transistor switches, the total area of one embodiment of the MMIC will fit in a chip area of 3 mm×3 mm.

Figure 3:
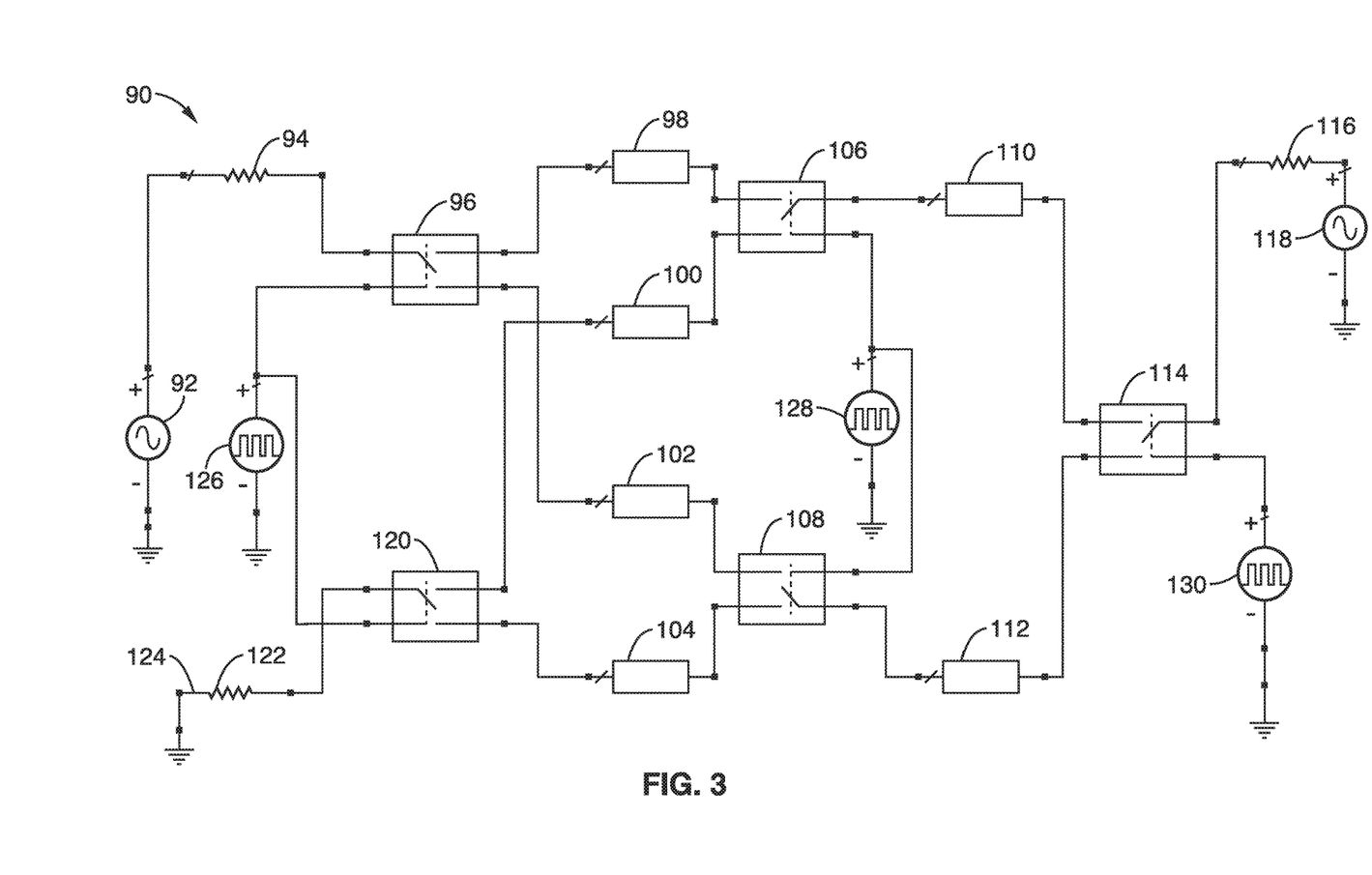
FIG. 3 is a block diagram for a simulation (ADS simulation) in performing transient circuit simulations of the SSDL circulator according to an embodiment of the disclosed technology.

FIG. 3 illustrates an example embodiment 90 utilized with ADS transient circuit simulation which has been carried out to validate the circulator design. A transmit source 92 is directed through resistance 94 to first switch 96 to a first group of TL segments 98, 102 (within TL segments 98, 100, 102, 104), to switches 106, 108, through second TL segments 110, 112, onto switch 114, through antenna comprising resistance 116 with source 118. Receiver signals travel in the reverse from antenna source 118 through resistance 116 to switch 114, TL segments 110, 112, into switch 106, 108 to TL segments 100, 104, to switch 120, to receiver output 124 through resistance 122. The switches are shown being controlled by signal source 126 driving switches 96, 120, signal source 128 driving switches 106, 108, and signal source 130 driving switch 114.

In this specific simulation, switches are assumed to be 0.1 μm GaN HEMT switches with switch on resistance of 5 Ohm and off capacitance of 0.1 pF. Table 1 provides details on the parameters utilized in this simulation.

Figure 4:
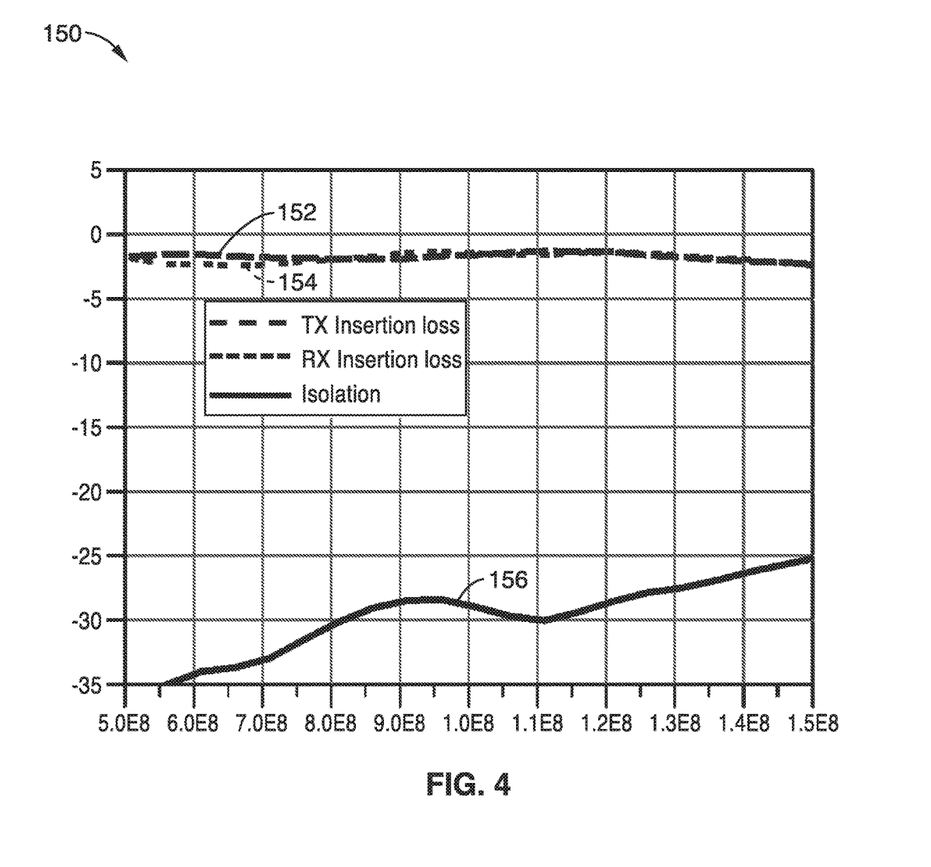
FIG. 4 is a plot resulting from transient circuit simulations of insertion loss and isolation of an SSDL according to an embodiment of the disclosed technology.

FIG. 4 depicts a plot 150 of simulated isolation 156 and insertion loss (TX 152 and RX 154 insertion losses) results for simulating the block diagram of FIG. 3. The results indicate a very flat, greater than 25 dB isolation is obtained along with insertion loss of less than 1.6 dB for a frequency from 500 MHz to 1.5 GHz. As only passive switches are utilized, only the power of driving the gates of the switches is counted toward determining the power dissipation, which is typically in the range of a few milliwatts.

Figure 5:
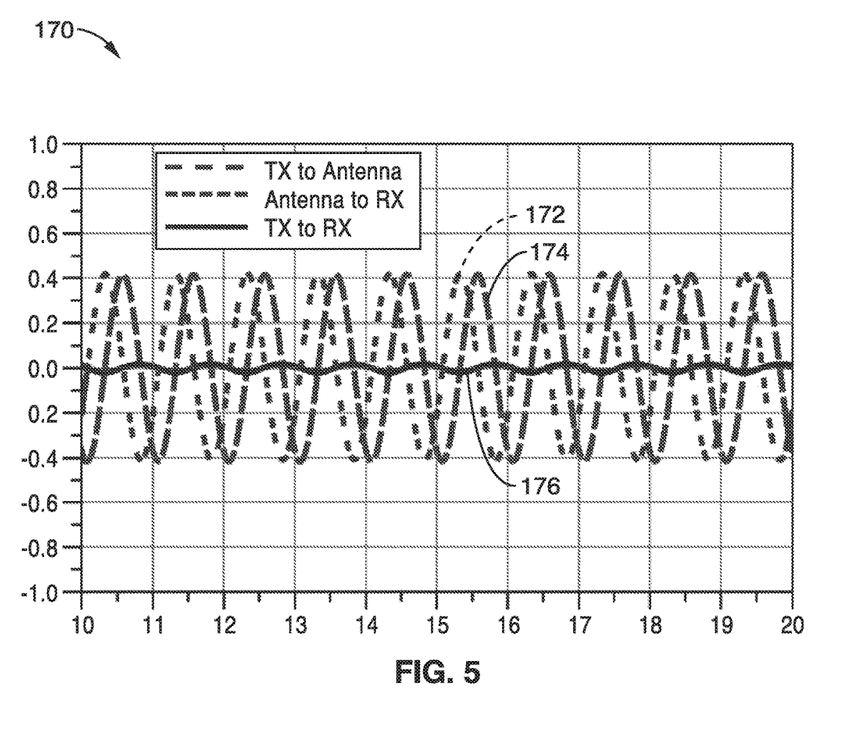
FIG. 5 is a plot of simulated waveforms at different ports from an excitation of 1 GHz with 1V p-p of an SSDL according to an embodiment of the disclosed technology.

FIG. 5 depicts a plot 170 of waveforms appearing at different ports, which clearly indicates very little leakage is coupled from TX to RX while the magnitude of the wave is retained for both TX to ANT and ANT to RX. The plot shows signal from TX to Antenna 172, from Antenna to RX 174, and from TX to RX 176, indicating very little of the signals 172, 174 are coupled from TX to RX 176.

As indicated by both the design theory and the simulations, the speed and the dynamic loss of the switches are crucial to the performance of the circulator. To maximize switch performance, the Northrop Grumman (NG) InP HEMT with a 35 nm gate length is a promising technology. This transistor demonstrates measured transconductance of 1600 mS/mm with breakdown voltage exceeding 2.5V, fT of 400 GHz, and $f_{max}$ exceeding 600 GHz. Although it will be appreciated that other switches may be utilized without departing from the teachings of the present disclosure. On-wafer measured results for a single stage CPW common-source amplifier using two-finger devices with a periphery of 30 μm demonstrates a measured gain of 4 dB peaked at 260 GHz, not including the loss of the launch with 1.25 dB gain up to 300 GHz. This process includes thin-film resistors and MIM capacitors, and recently, NG extended the technology to achieve greater than 1 THz performance, which is a world record. This represents the highest frequency active circuit reported to date. For this application, NG plans to design various switches for optimal performance within the proposed SSDL circulator. Based on the simulation results and preliminary evaluation to the NG InP HEMT switch technologies, Table 2 shows possible specs for the simulation compared with expected results for subsequent phases of implementation.

From the description herein, it will be appreciated that that the present disclosure encompasses multiple embodiments which include, but are not limited to, the following:

1. An ultra-wide band circulator apparatus, comprising: (a) a plurality of delay line segments; and (b) a switch coupled between each of said plurality of delay line segments to form a sequentially-switched delay line (SSDL); (c) wherein each said switch in said sequentially-switched delay line (SSDL) is configured for being sequentially turned on and off to connect and disconnect, or connect different paths, along adjoining delay line segments; and (d) wherein said switches are sequentially switched for synchronicity with first and second transient signals, for either (i) passing the first transient signal and blocking the second transient signal, or alternatively passing the second transient signal and blocking the first transient signal, to thus separate the first and second transient signals, or (ii) redirecting the first and second transient signals along different paths to separate the signals.

2. The apparatus of any preceding embodiment, wherein said switch is a single pole switch which either allows passage of a transient signal or blocks its.

3. The apparatus of any preceding embodiment, wherein said switch is a multiple pole switch which can select which path a transient signal is directed along.

4. The apparatus of any preceding embodiment, wherein said sequentially-switched delay lines (SSDLs) are configured for breaking space-time symmetry of wave propagation.

5. The apparatus of any preceding embodiment, wherein said plurality of delay line segments comprise at least four segments of delay lines.

6. The apparatus of any preceding embodiment, wherein each of said plurality of delay line segments is selected from the group of delay line segments consisting of a transmission line (TL), surface acoustic wave (SAW) delay line, optical fiber, LC filter network, or combinations thereof.

7. The apparatus of any preceding embodiment, wherein said ultra-wide band circulator apparatus is configured for use in a communication system as a means of separating transmitted and received signals.

8. The apparatus of any preceding embodiment, wherein said ultra-wide band circulator apparatus is configured for being integrated on an integrated circuit chip, and/or integrated in wireless transmitters and radar sensor systems that require reciprocity.

9. An ultra-wide band circulator apparatus, comprising: (a) a plurality of delay line segments; and (b) a switch coupled between each of said plurality of delay line segments to form a sequentially-switched delay line (SSDL); (c) wherein each said switch in said sequentially-switched delay line (SSDL) is configured for being sequentially turned on and off to connect and disconnect adjoining delay line segments; and (d) wherein said switches are sequentially switched for synchronicity with transient signals passing in a first direction so that these signals pass through said apparatus, while signals attempting to traverse in the opposite direction are blocked.

10. The apparatus of any preceding embodiment, wherein said sequentially-switched delay lines (SSDLs) are configured for breaking space-time symmetry of wave propagation.

11. The apparatus of any preceding embodiment, wherein said plurality of delay line segments comprise at least four delay line segments.

12. The apparatus of any preceding embodiment, wherein said plurality of delay line segments comprise approximately six delay line segments.

13. The apparatus of any preceding embodiment, wherein each of said plurality of delay line segments is selected from the group of delay line segments consisting of a transmission line (TL), surface acoustic wave (SAW) delay line, optical fiber, LC filter network, or combinations thereof.

14. The apparatus of any preceding embodiment, wherein said ultra-wide band circulator apparatus is configured for use in a communication system as a means of separating transmitted and received signals.

15. The apparatus of any preceding embodiment, wherein said ultra-wide band circulator apparatus is configured for being integrated on an integrated circuit chip.

16. The apparatus of any preceding embodiment, wherein said ultra-wide band circulator apparatus is configured for integration in wireless transmitters and radar sensor systems that require reciprocity.

17. An ultra-wide band circulator apparatus, comprising: (a) a first pair of switches each coupling a single delay line section to a selected first or second path; (b) a second pair of switches each coupling either a first or second path to a single delay line section; (c) four delay lines sections coupled between said first and second pair of switches, with a first pair of delay line sections coupling directly from the first pair of switches to the second pair of switches, and a second pair of delay line sections crossing over from said first pair of delay line sections to the second pair of delay line sections; (d) wherein said first and second pairs of switches allow selectively routing signals to, or from, either of the first pair of switches or the second pair of switches, depending on the direction of signal travel; (e) an antenna switch configured for connection to an antenna on its common input; (f) a first and second antenna delay line coupled between poles of said antenna switch to the common input of said second pair of switches, for selectively directing signals to, and from, said second pair of switches to said antenna switch which selects a signal to couple onto or from the antenna; (g) wherein said four delay line sections and said first and second antenna delay lines comprise sequentially-switched delay lines (SSDLs) configured for breaking space-time symmetry of wave propagation; (h) a control circuit configured for generating control signals for switching said first and second pairs of switches and said antenna switch to split transmitted and received waves into two pulses synchronized with the switching of the switches and thus separating the transmit and receive signals.

18. The apparatus of any preceding embodiment, wherein said ultra-wide band circulator apparatus is configured for use in a communication system as a means of separating transmitted and received signals.

19. The apparatus of any preceding embodiment, wherein said ultra-wide band circulator apparatus is configured for being integrated on an integrated circuit chip.

20. The apparatus of any preceding embodiment, wherein said ultra-wide band circulator apparatus is configured for integration in wireless transmitters and radar sensor systems that require reciprocity.

21. The apparatus of any preceding embodiment, wherein each of said plurality of delay line sections is selected from the group of delay line sections consisting of a transmission line (TL), surface acoustic wave (SAW) delay line, optical fiber, LC filter network, or combinations thereof.

22. An ultra-wide band circulator apparatus, comprising: (a) a transmitter demultiplexor having an input node configured for coupling to a transmitter, and having a first and second pole output; (b) a first delay line segment along a first transmitter signal path having a proximal end coupled to the first pole output of said transmitter demultiplexor; (c) a second delay line segment along a second transmitter signal path having a proximal end coupled to the second pole output of said transmitter demultiplexor; (d) a receiver multiplexor having a first and second pole input and an output configured for coupling to a receiver; (e) a third delay line segment along a first receiver signal path having a proximal end coupled to the first pole input of said receiver multiplexor; (f) a fourth delay line segment along a second receiver signal path having a proximal end coupled to the second pole input of said receiver multiplexor; (g) a transmit/receive switch having two poles and a common node, with said first pole coupled to a distal end of said first delay line segment along said first transmitter signal path, with said second pole coupled to a distal end of said third delay line segment along said first receiver signal path; (h) a fifth delay line segment having a proximal end coupled to the common node of said transmit/receive switch; (j) a receive/transmit switch having two poles and a common node, with said first pole coupled to a distal end of said second delay line segment along said first transmitter signal path, with said second pole coupled to a distal end of said fourth delay line segment along said second receiver signal path; (k) a sixth delay line segment having a proximal end coupled to the common node of said receive/transmit switch; and (l) an antenna multiplexor/demultiplexor switch having a first pole coupled to the distal end of said fifth delay line, and a second pole coupled to the distal end of said sixth delay line, with said antenna multiplexor/demultiplexor switch having a common node configured for coupling to an antenna; (m) wherein a control circuit generates control signals for switching said transmitter demultiplexor, said receiver multiplexor, said transmit/receive switch, said receive/transmit switch, and said antenna multiplexor/demultiplexor switch to split transmitted and received waves into two pulses synchronized with the switching of the switches and thus separating the transmit and receive signals.

23. The apparatus of any preceding embodiment, wherein said ultra-wide band circulator apparatus is configured for use in a communication system as a means of separating transmitted and received signals.

24. The apparatus of any preceding embodiment, wherein said ultra-wide band circulator apparatus is configured for being integrated on an integrated circuit chip.

25. The apparatus of any preceding embodiment, wherein said ultra-wide band circulator apparatus is configured for integration in wireless transmitters and radar sensor systems that require reciprocity.

26. The apparatus of any preceding embodiment, wherein each of delay line segment is selected from the group of delay line segments consisting of a transmission line (TL), surface acoustic wave (SAW) delay line, optical fiber, LC filter network, or combinations thereof.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

ADS Simulation Parameters for FIG. 3

Transient: Tran1 StopTime = 40.0 nSec, MaxTimeStep = 0.05 nSec
Variable: Var1 Ron = 2 Ohm, fs = 1 GHz
MeasEqn: Meas2
AntennaRMS = max(abs(fft(V_antenna)))
RX_RMS = max(abs(fft(V_RX))), TX_RMS = max(abs(fft(V_TX)))
IL_R = RX_RMS/Antenna_RMS, IL_T = Antenna_RMS/TX_RMS
TX_Spec = abs(fft(V_RX)), IS = RX_RMS/TX_RMS
Parameter Sweep: Sweep1
SweepVar = "fs", SimInstanceName[1]-[6] = "Tran1"
Start = 0.51e9, Stop = 1.51e9, Step = 10000000
TX Source: VtSine
SRC2 (92) Amplitude = 1 V, SRC5 (118) Amplitude = 0 V
Vdc = 0 V, Freq = fs, Delay = 0 nSec, Damping = 0, Phase = 0
Resistors
R1 (94), R2 (122), R3 (116): R = 50 Ohm
Switches: SPDT_Dynamic
SWITCH1 (96), SWITCH2 (120), SWITCH3 (106),
SWITCH4 (108), SWITCH5 (114)
Ron = Ron, Roff = 1 MOhm
TL Segments: TLIN
TL1 (98), TL2 (100), TL3 (102), TL4 (104), TL5 (110), TL6 (112)
Z = 50.0 Ohm, E = 90, F = 3 GHz
Switch Control: VtBitSeq
SRC1 (126), SRC3 (128), SRC4 (130)
Vlow = 0 V, Vhigh = 5 V, Rate = 12 GHz,
Rise = 0.05 nSec, Fall = 0.05 nSec, Delay = 0.0 nSec
SRC1 BitSeq = "1100", SRC3 BitSeq = "0110", SRC4 BitSeq = "0011"

TABLE 2

Expected Specification per Phase Embodiment

| Metric | Simulation | Phase I | Phase II | Phase III |
|---|---|---|---|---|
| Frequency | 500 MHz-1.5 GHz | 500 MHz-1.5 GHz | 500 MHz-1.5 GHz | 500 MHz-1.5 GHz |
| Min. Bandwidth | 1 GHz | 1 GHz | 1 GHz | 1 GHz |
| Insertion Loss (dB) | 1.6 | 3 | 2.5 | 2 |
| Min. TX to RX Isolation (dB) | 25 | 15 | 20 | 25 |
| Return Loss into Antenna (dB) | 25 | 15 | 20 | 25 |
| Max. Noise Fig. (dB) | 1.6 | 4 | 3 | 2.5 |
| Output P1 dB (dBm) | * | 23 | 29 | 36 |
| Max. Power Consumed (mW) | * | 100 | 80 | 50 |
| Temp. Range (° C.) | * | 20-30 | 0-70 | 0-70 |
| Max. Dimension (mm) | 3 (estimate) | 10 | 6 | 3 |

What is claimed is:

1. An ultra-wide band circulator apparatus, comprising:
 (a) a plurality of delay line segments; and
 (b) a switch coupled between each of said plurality of delay line segments to form a sequentially-switched delay line (SSDL);
 (c) wherein each said switch in said sequentially-switched delay line (SSDL) is configured for being sequentially turned on and off to connect and disconnect, or connect different paths, along adjoining delay line segments; and
 (d) wherein said switches are sequentially switched for synchronicity with first and second transient signals, for either (i) passing the first transient signal and blocking the second transient signal, or alternatively passing the second transient signal and blocking the first transient signal, to thus separate the first and second transient signals, or (ii) redirecting the first and second transient signals along different paths to separate the signals.

2. The apparatus of claim 1, wherein said switch is a single pole switch which either allows passage of a transient signal or blocks it.

3. The apparatus of claim 1, wherein said switch is a multiple pole switch which can select which path a transient signal is directed along.

4. The apparatus of claim 1, wherein said sequentially-switched delay lines (SSDLs) are configured for breaking space-time symmetry of wave propagation.

5. The apparatus of claim 1, wherein said plurality of delay line segments comprise at least four segments of delay lines.

6. The apparatus of claim 1, wherein each of said plurality of delay line segments is selected from the group of delay line segments consisting of a transmission line (TL), surface acoustic wave (SAW) delay line, optical fiber, LC filter network, or combinations thereof.

7. The apparatus of claim 1, wherein said ultra-wide band circulator apparatus is configured for use in a communication system as a means of separating transmitted and received signals.

8. The apparatus of claim 1, wherein said ultra-wide band circulator apparatus is configured for being integrated on an integrated circuit chip, and/or integrated in wireless transmitters and radar sensor systems that require reciprocity.

9. An ultra-wide band circulator apparatus, comprising:
 (a) a plurality of delay line segments; and
 (b) a switch coupled between each of said plurality of delay line segments to form a sequentially-switched delay line (SSDL);
 (c) wherein each said switch in said sequentially-switched delay line (SSDL) is configured for being sequentially turned on and off to connect and disconnect adjoining delay line segments; and
 (d) wherein said switches are sequentially switched for synchronicity with transient signals passing in a first direction so that these signals pass through said apparatus, while signals attempting to traverse in the opposite direction are blocked.

10. The apparatus of claim 9, wherein said sequentially-switched delay lines (SSDLs) are configured for breaking space-time symmetry of wave propagation.

11. The apparatus of claim 9, wherein said plurality of delay line segments comprise at least four delay line segments.

12. The apparatus of claim 9, wherein said plurality of delay line segments comprise approximately six delay line segments.

13. The apparatus of claim 9, wherein each of said plurality of delay line segments is selected from the group of delay line segments consisting of a transmission line (TL), surface acoustic wave (SAW) delay line, optical fiber, LC filter network, or combinations thereof.

14. The apparatus of claim 9, wherein said ultra-wide band circulator apparatus is configured for use in a communication system as a means of separating transmitted and received signals.

15. The apparatus of claim 9, wherein said ultra-wide band circulator apparatus is configured for being integrated on an integrated circuit chip.

16. The apparatus of claim 9, wherein said ultra-wide band circulator apparatus is configured for integration in wireless transmitters and radar sensor systems that require reciprocity.

17. An ultra-wide band circulator apparatus, comprising:
(a) a first pair of switches each coupling a single delay line section to a selected first or second path;
(b) a second pair of switches each coupling either a first or second path to a single delay line section;
(c) four delay lines sections coupled between said first and second pair of switches, with a first pair of delay line sections coupling directly from the first pair of switches to the second pair of switches, and a second pair of delay line sections crossing over from said first pair of delay line sections to the second pair of delay line sections;
(d) wherein said first and second pairs of switches allow selectively routing signals to, or from, either of the first pair of switches or the second pair of switches, depending on the direction of signal travel;
(e) an antenna switch configured for connection to an antenna on its common input;
(f) a first and second antenna delay line coupled between poles of said antenna switch to the common input of said second pair of switches, for selectively directing signals to, and from, said second pair of switches to said antenna switch which selects a signal to couple onto or from the antenna;
(g) wherein said four delay line sections and said first and second antenna delay lines comprise sequentially-switched delay lines (SSDLs) configured for breaking space-time symmetry of wave propagation;
(h) a control circuit configured for generating control signals for switching said first and second pairs of switches and said antenna switch to split transmitted and received waves into two pulses synchronized with the switching of the switches and thus separating the transmit and receive signals.

18. The apparatus of claim 17, wherein said ultra-wide band circulator apparatus is configured for use in a communication system as a means of separating transmitted and received signals.

19. The apparatus of claim 17, wherein said ultra-wide band circulator apparatus is configured for being integrated on an integrated circuit chip.

20. The apparatus of claim 17, wherein said ultra-wide band circulator apparatus is configured for integration in wireless transmitters and radar sensor systems that require reciprocity.

21. The apparatus of claim 17, wherein each of said plurality of delay line sections is selected from the group of delay line sections consisting of a transmission line (TL), surface acoustic wave (SAW) delay line, optical fiber, LC filter network, or combinations thereof.

22. An ultra-wide band circulator apparatus, comprising:
(a) a transmitter demultiplexor having an input node configured for coupling to a transmitter, and having a first and second pole output;
(b) a first delay line segment along a first transmitter signal path having a proximal end coupled to the first pole output of said transmitter demultiplexor;
(c) a second delay line segment along a second transmitter signal path having a proximal end coupled to the second pole output of said transmitter demultiplexor;
(d) a receiver multiplexor having a first and second pole input and an output configured for coupling to a receiver;
(e) a third delay line segment along a first receiver signal path having a proximal end coupled to the first pole input of said receiver multiplexor;
(f) a fourth delay line segment along a second receiver signal path having a proximal end coupled to the second pole input of said receiver multiplexor;
(g) a transmit/receive switch having two poles and a common node, with said first pole coupled to a distal end of said first delay line segment along said first transmitter signal path, with said second pole coupled to a distal end of said third delay line segment along said first receiver signal path;
(h) a fifth delay line segment having a proximal end coupled to the common node of said transmit/receive switch;
(j) a receive/transmit switch having two poles and a common node, with said first pole coupled to a distal end of said second delay line segment along said first transmitter signal path, with said second pole coupled to a distal end of said fourth delay line segment along said second receiver signal path;
(k) a sixth delay line segment having a proximal end coupled to the common node of said receive/transmit switch; and
(l) an antenna multiplexor/demultiplexor switch having a first pole coupled to the distal end of said fifth delay line, and a second pole coupled to the distal end of said sixth delay line, with said antenna multiplexor/demultiplexor switch having a common node configured for coupling to an antenna;
(m) wherein a control circuit generates control signals for switching said transmitter demultiplexor, said receiver multiplexor, said transmit/receive switch, said receive/transmit switch, and said antenna multiplexor/demultiplexor switch to split transmitted and received waves into two pulses synchronized with the switching of the switches and thus separating the transmit and receive signals.

23. The apparatus of claim 22, wherein said ultra-wide band circulator apparatus is configured for use in a communication system as a means of separating transmitted and received signals.

24. The apparatus of claim 22, wherein said ultra-wide band circulator apparatus is configured for being integrated on an integrated circuit chip.

25. The apparatus of claim 22, wherein said ultra-wide band circulator apparatus is configured for integration in wireless transmitters and radar sensor systems that require reciprocity.

26. The apparatus of claim 22, wherein each of delay line segment is selected from the group of delay line segments consisting of a transmission line (TL), surface acoustic wave (SAW) delay line, optical fiber, LC filter network, or combinations thereof.

\* \* \* \* \*